(12) United States Patent
Johansson

(10) Patent No.: US 6,971,674 B2
(45) Date of Patent: Dec. 6, 2005

(54) INFLATABLE AIR-BAG AND METHOD FOR MANUFACTURING THE SAME

(75) Inventor: Mats Johansson, Aplared (SE)

(73) Assignee: FOV Fabrics AB, Borås (SE)

( * ) Notice: Subject to any disclaimer, the term of this patent is extended or adjusted under 35 U.S.C. 154(b) by 147 days.

(21) Appl. No.: 10/470,298

(22) PCT Filed: Feb. 4, 2002

(86) PCT No.: PCT/SE02/00187

§ 371 (c)(1),
(2), (4) Date: Aug. 26, 2003

(87) PCT Pub. No.: WO02/062627

PCT Pub. Date: Aug. 15, 2002

(65) Prior Publication Data

US 2004/0070180 A1    Apr. 15, 2004

(30) Foreign Application Priority Data

Feb. 6, 2001    (SE) .................................. 0100352

(51) Int. Cl.$^7$ ............................................ B60R 21/16
(52) U.S. Cl. ................................. 280/743.1; 280/729
(58) Field of Search ..................... 280/743.1, 728.1, 280/729

(56) References Cited

U.S. PATENT DOCUMENTS

| | | | |
|---|---|---|---|
| 5,480,181 A | 1/1996 | Bark et al. | |
| 5,630,620 A * | 5/1997 | Hirai et al. | 280/743.1 |
| 5,653,464 A | 8/1997 | Breed et al. | |
| 6,113,141 A * | 9/2000 | Baker | 280/743.2 |
| 6,220,629 B1 * | 4/2001 | Wipasuramonton et al. | 280/743.1 |
| 6,264,234 B1 * | 7/2001 | Hill et al. | 280/730.2 |
| 6,550,809 B1 * | 4/2003 | Masuda et al. | 280/743.1 |
| 6,585,293 B2 * | 7/2003 | Keshavaraj | 280/743.1 |
| 6,598,902 B2 * | 7/2003 | Keshavaraj | 280/743.1 |

FOREIGN PATENT DOCUMENTS

| | | |
|---|---|---|
| DE | 2122019 | 11/1971 |
| DE | 198 52 232 A1 * | 5/2000 |
| EP | 0 459 526 | 4/1991 |
| EP | 0 962 363 A1 * | 12/1999 |
| EP | 1 044 803 | 10/2000 |
| GB | 2 331 955 A * | 6/1999 |
| GB | 2 345 008 | 6/2000 |

* cited by examiner

Primary Examiner—Ruth Ilan
(74) Attorney, Agent, or Firm—Buchanan & Ingersoll PC

(57) ABSTRACT

The invention relates to an inflatable airbag for vehicles. The airbag comprises at least one seam interconnecting the fabric layers of the airbag, and an inner gas-impermeable bag. The invention likewise relates to a method of manufacturing an inflatable airbag comprising fabric layers. A gas-impermeable bag is sewn in position between the fabric layers. Alternatively, two joined-together gas-impermeable layers form the gas-impermeable bag, which gas-impermeable layers are sewn in position between the two fabric layers.

2 Claims, 1 Drawing Sheet

INFLATABLE AIR-BAG AND METHOD FOR MANUFACTURING THE SAME

TECHNICAL FIELD OF INVENTION

The present invention relates to an inflatable airbag for vehicles, said airbag comprising at least one seam interconnecting the fabric layers of the airbag. The invention likewise comprises a method of manufacturing an inflatable airbag for vehicles, said airbag comprising at least one seam interconnecting the fabric layers of the airbag.

TECHNICAL BACKGROUND OF THE INVENTION

On the whole, inflatable airbags or impact-protection bags are standard equipment in all cars being manufactured to-day. This is particularly true as regards impact-protection bags that are designed to serve as protection in case of head-on collisions. However, the requirements on safety have increased, resulting in the development of lateral impact-protection means, lateral curtains, and so-called roll-over protection means serving as protection in case the car rolls over.

In all types of collisions, it is important that the airbag is filled rapidly. In head-on collisions, it is also important that the air pressure, which has built up rapidly, also goes down rapidly after the collision, in order to allow the airbag to catch the driver or the passengers as softly as possible and to allow them to move and be able to get out of the vehicle after the collision. Traditionally, this type of airbags have been made from stitched-together pieces of a fabric or been woven in one piece, jacquard-woven fabric, said fabrics in many cases having been coated on the inside or outside with silicone, for example, in order to reduce the gas-flow through the fabric.

In contrast, in the case of lateral protection curtains and roll-over protection means it is important that an excess pressure be maintained in the inflatable airbag for as long as possible, preferably for more than five-seconds, considering that the car roll-over time generally is longer than the head-on collision time. In accordance with one prior-art technique for making it possible to prolong the time during which the excess pressure is maintained inside an inflatable airbag, in addition to inside the seamless woven airbag having a silicone-coated inside or outside, silicone-coated fabric layers are joined together to form an inflatable airbag in which the coated face is turned inwards. In order to prevent air from escaping at the seams, the two fabric layers are joined together by means of glue applied along the seams and on both sides of the seams. Owing to this solution, the load is exerted on the glue joints when the airbag is being inflated and not on the seams. One example of this solution is described in DE 19852232-A1, wherein the glue joint also covers the seams on the external face of the inflatable airbag. GB 2343868-A describes a similar solution, using glue joints in combination with seams.

Coating fabrics with silicone or some other substance is a time-consuming and extremely expensive procedure. Furthermore, it is difficult to glue-together two silicone-coated fabric layers, since few materials adhere to silicone-coated surfaces. In addition, the application of glue at the seams involves an additional manufacturing step that requires a high degree of precision. In these cases, the time during which an excess-pressure is maintained inside an airbag often is the shortest one required.

SUMMARY OF THE INVENTION

The object of the present invention therefore is to provide an inflatable airbag that is able to maintain an excess pressure for a prolonged period upon inflation, and a method of manufacturing an inflatable airbag of this kind. This object has been achieved according to the invention by means of an inflatable airbag possessing the characteristic features that are defined in the appended claim 1 and the preferred embodiments defined in the dependent claims 6–10.

The inventive inflatable airbag thus employs a gas-impermeable bag placed inside the stitched-together outer fabric bag. In the conventional solutions, as also according to the present invention, a considerable load is exerted on the seams. In the present invention, however, the seam has no sealing function, and consequently it is not crucial to the sealing ability of the airbag if considerable load is exerted on the seams. Nor is it necessary to coat the fabric with silicone or a similar product to make it impermeable. Also the gluing step is eliminated, since the impermeable component of the airbag is a bag. The gas-impermeable inner bag preferably is made from two joined-together gas-impermeable layers. The gas-impermeable layers preferably are immobilised in their planes relative to the fabric layers. An essential feature of the invention is also that the gas-impermeable layers are interconnected in an area spaced from the seam that interconnects all the layers. The advantage of this arrangement is that the load will be concentrated on the seam that is without importance to the sealing properties. The gas-impermeable layers preferably are joined together by means of welding, which has the advantage of eliminating the need for extra material.

The invention likewise is based on the idea of manufacturing an inflatable airbag by sewing in position an inner gas-impermeable bag between two layers of a fabric. The advantages of this arrangement are that the fabric need not be laminated in order to become gas-impermeable, which facilitates the manufacture in addition to making it less expensive.

In accordance with another embodiment, two gas-impermeable layers are instead sewn in position between the fabric layers. The advantage of this arrangement is that a custom-made inner bag having a predetermined shape need not be manufactured in advance and fitted in position. Preferably, the gas-impermeable layers are joined together simultaneously with the stitching-together of all layers that constitute the inflatable airbag. The advantage gained hereby is thus that all manufacturing steps are carried out in one single working moment. In an alternative embodiment, the gas-impermeable layers are joined together in one single working moment following the stitching-together of the constituent layers. Preferably, the gas-impermeable layers are joined together by welding. This welding operation could be for example thermal, laser or high-frequency welding. The heat is adjusted so as not to affect the enclosing fabric of the inflatable airbag, i.e. the heat should be sufficiently high to melt-join the gas-impermeable layers but not sufficiently high to affect the fabric layers.

BRIEF DESCRIPTION OF THE DRAWINGS

The invention will be described in the following in more detail by means of one embodiment with reference to the accompanying drawings. In the drawings.

DETAILED DESCRIPTION OF PREFERRED EMBODIMENTS

Figure 1:
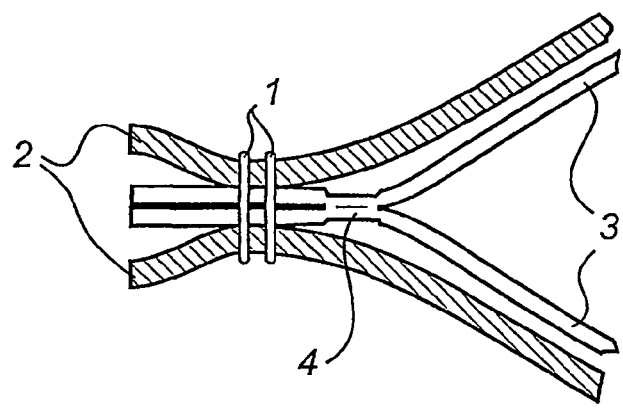
FIG. 1 is a cross-sectional view of the seam and the layers included in a preferred embodiment of an inflatable airbag in accordance with the present invention.

FIG. 1 is a cross-sectional view of a part of the inflatable airbag 5. Two layers 2 of fabric and two gas-impermeable layers 3 are joined together by a stitched seam 1. The gas-impermeable layers could consist for instance of a polymer that is resistant to the strong heat that develops as the airbag 5 is being inflated. The gas-impermeable layers are joined-together by a weld 4 spaced a small distance from the stitched seam 1. The welding could be effected for instance by means of a (sewing-machine) foot, which is fitted with a heating element that welds the two gas-impermeable layers 3 together at a distance spaced from the stitched seam 1 at the same time as all layers 2, 3 are stitched together. However, the joining-together operation preferably is effected by means of high-frequency welding.

Figure 2:
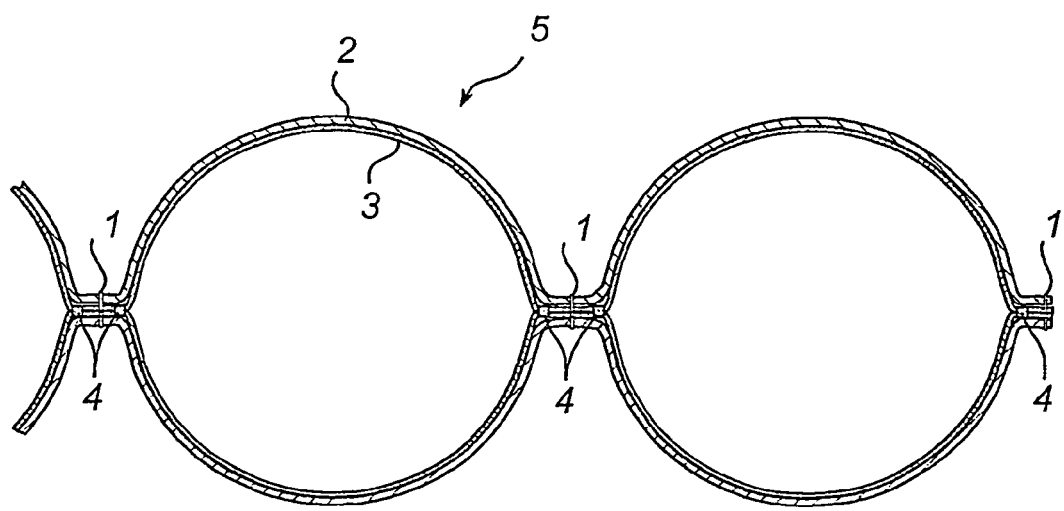
FIG. 2 is a cross-sectional view of an airbag in its inflated condition.

An inflatable airbag 5 comprising several channels is shown in a cross-sectional view in FIG. 2. The figure shows that the sealing properties are not affected by loads exerted on the stitched seams 1, which is one of the main ideas of the invention. When the gas-impermeable layer expands upon inflation in response to pressure and/or heat, a load will eventually affect the stitched seams. However, owing to the arrangements of the present invention it is without significance to the sealing properties of the airbag 5 that the stitched seams are exposed to load, since the weld 4 is spaced from the stitched seam. Alternatively, the stitched seam 1 and the weld 4 may be arranged in such a manner that the weld 4 covers the stitched seam 1, which means that the stitched seam 1 will not be exposed to load as the airbag is being inflated. However, this arrangement is conditioned on the weld 4 being sufficiently wide on the inner side of the stitched seam 1 in order to absorb the load.

It should be appreciated that many modifications of the above-described embodiment of the invention are possible within the scope of protection of the invention as defined in the appended claims. As previously mentioned, the gas-impermeable layers 3 may for example be welded together prior be being placed between the fabric layers 2 to be stitched in position. Alternatively, also the gas-impermeable layers 3 may be joined together in some other way than by welding, for example by means of a glue joint. Yet another alternative may be to attach the gas-impermeable layers 3 to the fabric layers 2 prior to the gas-impermeable layers 3 being welded together and prior to all layers being stitched together. This could be effected in the form of a laminate but such that the adherence of the gas-impermeable layers 3 to the fabric layers 3 is weaker than the weld 4 of the gas-impermeable layers 3.

What is claimed is:

1. An inflatable airbag for vehicles, said airbag comprising:

at least one seam interconnecting fabric layers of the airbag, wherein said airbag comprises a gas-impermeable bag, said gas-impermeable bag comprising two gas-impermeable layers joined together at a portion between the seam and a middle of the airbag in order to form an airtight volume interiorly of the seal wherein the seam interconnects at least the fabric layers and the two gas-impermeable layers.

2. An inflatable airbag as claimed in claim 1, wherein the joining-together is in the form of a weld.

* * * * *